United States Patent [19]

Nozari

[11] 4,049,861

[45] Sept. 20, 1977

[54] ABRASION RESISTANT COATINGS

[75] Inventor: Mohammad S. Nozari, Woodbury, Minn.

[73] Assignee: Minnesota Mining and Manufacturing Company, Saint Paul, Minn.

[21] Appl. No.: 659,527

[22] Filed: Feb. 19, 1976

Related U.S. Application Data

[63] Continuation-in-part of Ser. No. 556,392, March 7, 1975, abandoned.

[51] Int. Cl.$^2$ .................... B32B 27/38; B32B 27/26
[52] U.S. Cl. ............................. 428/220; 260/2 EC; 260/46.5 R; 260/46.5 E; 260/47 EC; 427/37 R; 427/386; 427/387; 427/402; 427/410; 427/407 G; 427/407 R; 428/334; 428/335; 428/336; 428/413; 428/417; 428/418; 428/447; 427/407 A
[58] Field of Search ............... 428/413, 417, 418, 447, 428/334–336, 220; 260/46.5 R, 46.5 E, 2 EC, 47 EC; 427/372, 386, 387, 402, 407, 410

[56] References Cited

U.S. PATENT DOCUMENTS

| | | | |
|---|---|---|---|
| 3,498,827 | 3/1970 | Vanderbilt et al. | 428/331 X |
| 3,586,616 | 6/1971 | Kropp | 204/159.11 |
| 3,632,843 | 1/1972 | Allen et al. | 260/2 EC |
| 3,637,416 | 1/1972 | Misch et al. | 428/447 X |
| 3,708,225 | 1/1973 | Misch et al. | 428/447 X |
| 3,762,981 | 10/1973 | Blank | 428/189 |
| 3,779,988 | 12/1973 | Rembold et al. | 260/46.5 G |
| 3,794,556 | 2/1974 | Young | 428/447 X |
| 3,842,019 | 10/1974 | Kropp | 260/2 EP |
| 3,907,706 | 9/1975 | Robins | 260/2 EC X |
| 3,955,035 | 5/1976 | Ito et al. | 428/413 X |
| 3,998,991 | 12/1976 | Kaas | 428/413 X |

FOREIGN PATENT DOCUMENTS 49-117529  11/1974  Japan

*Primary Examiner*—Harris A. Pitlick
*Attorney, Agent, or Firm*—Cruzan Alexander; Donald M. Sell; Mark A. Litman

[57] ABSTRACT

Abrasion resistant coatings comprising epoxy-terminated silanes cured in the presence of highly fluorinated aliphatic sulfonic and sulfonylic catalysts are solvent and abrasion resistant.

31 Claims, No Drawings

ABRASION RESISTANT COATINGS

This application is a continuation-in-part of U.S. Ser. No. 556,392, filed Mar. 7, 1975, now abandoned.

Abrasion resistant coatings have generally been used to protect against surface damage to substrates. For example, optical lenses are coated to prevent marring or scratching of the lens surface. These abrasion resistant coatings are ordinarily thin coatings of plastic cured in situ as a coating on the substrate.

Many compositions and methods have been previously suggested for applying abrasion resistant coatings to damageable substrates, but each suffers in a different fashon. Some compositions provide only minimum improvements in abrasion resistance while others are not practicable because of extreme processing conditions or excessive costs. For example, some of the modestly successful coatings require cure temperatures of about 150° C or more for extended periods of time. Such procedures are useless for coating imageable materials such as photoconductive sheets and electrophotographic sheets as well as any temperature sensitive substrate such as thermoplastic materials. Even for coating thermosetting polymers such conditions cause warping and decomposition.

Earlier methods for imparting abrasion resistance included vapor deposition of inorganic materials (e.g., metal oxides such as $SiO_2$, $ZrO_2$, etc.) Other inorganic materials used for abrasion resistance coatings are disclosed in U.S. Pat. Nos. 2,768,909 and 3,460,956. The former patent discloses coatings up to 1 micron in thickness of hydrolyzable metal organic esters. Thicker coatings are described as undesirable because of reduction in transparency, cohesion, and adhesion. Other coatings to increase abrasion resistance include organic resins and organic-inorganic blends such as are described in U.S. Pat. Nos. 2,481,809; 3,324,055; 3,575,998; 3,632,715; 3,642,681; 3,708,225; and 3,817,905.

Silicone polymers have been investigated as abrasion resistant coatings, but often suffer from brittleness, solvent sensitivity and coating difficulties. Ambifunctional silicone polymers such as vinyl- and epoxy-containing silanes have also been used in an attempt to overcome these difficulties, but only with marginal success.

For example, Japanese Patent (Tokai) No. 49-117529, issued Nov. 9, 1974, suggests the use of an epoxy-silane as an abrasion resistant coating by forming a precondensate of an epoxy-silane and adding as a catalyst a material selected from $ZnF_4$, $SnF_4$ or $CH_3(CH_2)_n NH_2BF_2$ (where $n$ is 0 or 1). The method and compositions shown in that reference is highly abrasion resistant, but the polymer is not completely cured by the processes taught in the disclosure and is subject to serious solvent attack. It is believed that the process shown appears to predominately cure only one functional group of the epoxy-silane or cure one group far more rapidly than the other so that a dual polymer network (of polysiloxane and polyepoxide) is not formed.

U.S. Pat. Nos. 3,637,416 and 3,762,981 also show cured epoxy-silanes, and these materials are neither highly abrasion resistant nor solvent resistant.

The cured products of the present invention have both a polyepoxide chain and a polysiloxane backbone within the polymer structure. The chain and backbone including the respective functional ends of the epoxy-silane. The crosslinked polymeric products of the present invention show excellent solvent resistance to water, toluene, acetone, octane and various other organic solvents.

The present invention overcomes many of the disadvantages of the prior art.

The coatings useful in the practice of the present invention are rapid curing, highly abrasion resistant, capable of room temperature cure, and resistant to corrosives and solvents. The low surface energy of the cured coatings further prevents adherence of foreign material to the surface. These coatings may be used as protective coatings on a wide variety of substrates, including metal, glass, wood, ceramics, natural and synthetic polymeric materials, etc.

The polymer coatings of the present invention comprise at least 15% by weight units derived from at least one epoxy terminated silane polymerized in catalytic proximity with a catalytically active amount of highly fluorinated aliphatic sulfonic or sulfonylic catalyst. Materials copolymerizable with the epoxy and siloxane group of the epoxy-terminated silane can be added in amounts up to 85% by weight of the system to modify its properties yet retain abrasion and solvent resistance. Certain fillers, especially silica, may be added in weight percentages of 50% and more, so these materials are not considered in the weight percentages of the polymer compositions. The coatings are from 0.1 to 500 microns, yet retain preferably 2–20 microns.

1. EPOXY TERMINATED SILANES

Epoxy-terminated silanes are compounds or materials having polymerizable (preferably terminal) epoxy groups and terminal, polymerizable silane groups, the bridging of these groups being through a non-hydrolyzable aliphatic, aromatic, or aliphatic and aromatic divalent hydrocarbon linkage which may have N and/or O atoms in the linkage chain. The O atoms for example would be within the chain only as ether linkages. These linkage chains may be generally substituted as is well known in the art, as these substituents on the chain do not greatly affect the functional ability of the epoxy-terminated silanes to under the essential reactions necessary to polymerization through the siloxane or epoxy terminal groups. Examples of substituents which may be present on the linkage or bridging moieties are groups such as $NO_2$, $CH_3(CH_2)_nCH_2$, methoxy, halogen, etc. In general structural formulae appearing within this description of the invention, such substitution of the bridging moieties is implied unless specifically excluded by language such as "unsubstituted divalent hydrocarbon radical".

Examples of preferred epoxy-terminated silane useful in the practice of this invention are compounds of the general formulae:

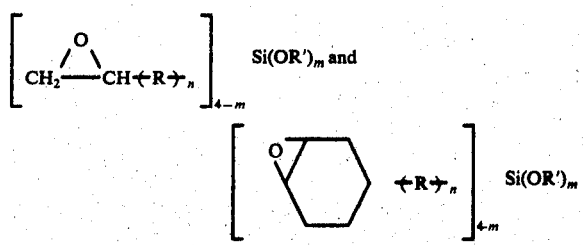

where R = a non-hydrolyzable divalent hydrocarbon radical (aliphatic, aromatic, or aliphatic and aromatic containing) of less than 20 carbon atoms or a divalent radical of less than 20 carbon atoms composed of C, H, N, S, and O atoms (these atoms are the only atoms which may appear in the backbone of the divalent radicals), the last being in the form of either linkages. No two heteroatoms may be adjacent within the backbone of the divalent hydrocarbon radical. This description defines divalent hydrocarbon radicals for epoxy terminated siloxanes in the practice of this invention. The value of $n$ is from 0 to 1, R' is an aliphatic hydrocarbon radical of less than 10 carbon atoms, an acyl radical of less than 10 carbon atoms, or a radical of formula $(CH_2CH_2O)_kZ$ in which $k$ is an integer of at least 1 and Z is an aliphatic hydrocarbon radical of less than 10 carbon atoms or hydrogen, $m$ has values of 1 to 3.

The compositions employed in this invention can be an epoxy silane of the above formula in which R is any divalent hydrocarbon radical such as methylene, ethylene, decalene, phenylene, cyclohexylene, cyclopentylene, methylcyclohexylene, 2-ethylbutylene, and allene or an ether radical such as $-CH_2-CH_2-O-CH_2-CH_2-$, $(CH_2-CH_2O)_2-CH_2-CH_2-$,

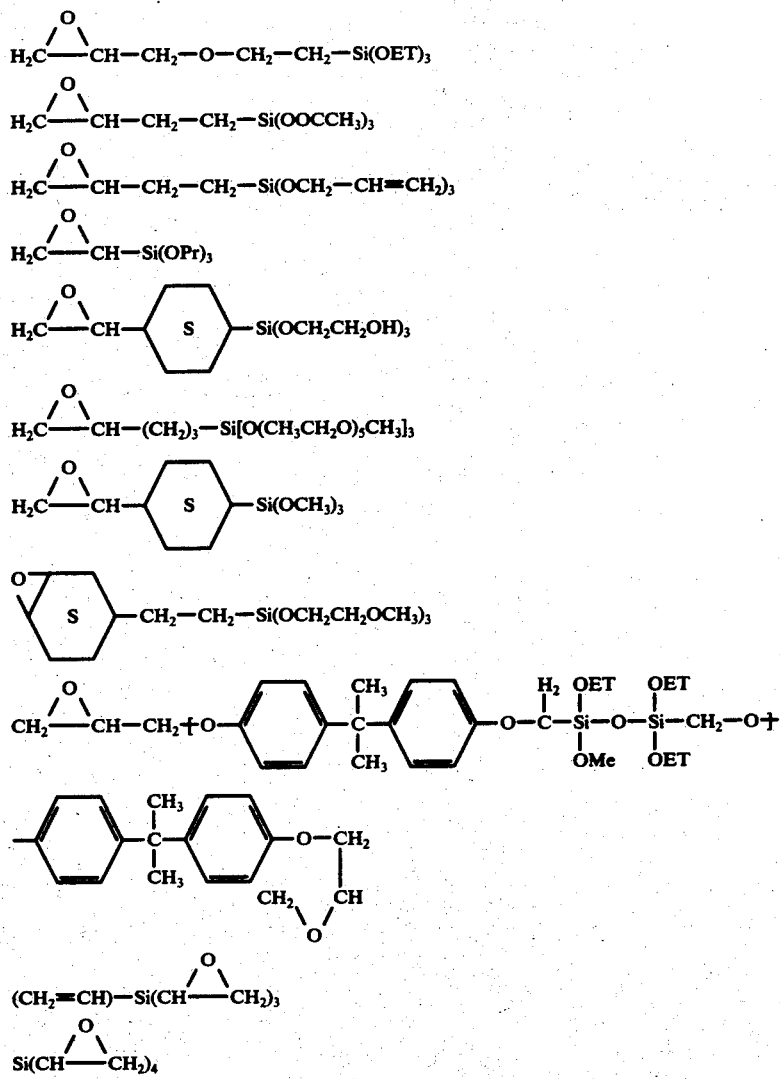

and $-CH_2O-(CH_2)_3-$, R' can be any aliphatic hydrocarbon radical of less than 10 carbon atoms such as methyl, ethyl, isopropyl, butyl, vinyl, alkyl, or any acyl radical of less than 10 carbon atoms such as formyl, acetyl, propionyl, or any radical of the formula $(CH_2CH_2O)_kZ$ in which $k$ is an integer of at least 1, for example 2, 5, and 8, and Z is hydrogen or any aliphatic hydrocarbon radical of less than 10 carbon atoms such as methyl, ethyl, isopropyl, butyl, vinyl and allyl.

In addition to any of the above silanes the compositions of this invention can be any hydrolyzate or precondensate of the said silanes. These hydrolyzates can be formed by the partial or complete hydrolysis of the silane OR' groups. Thus the term precondensate includes siloxanes in which some or all of the silicon atoms are bonded through oxygen atoms. The following compounds are illustrative of some of useful materials in the process of this invention and should not be construed as limiting the invention which is properly explained above:

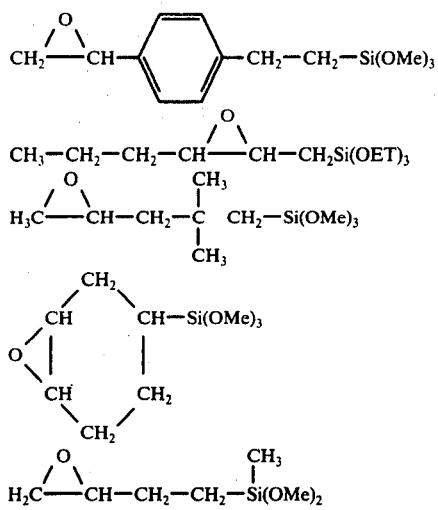

The preparation of most of the above compounds have been described in the U.S. Pat. No. 3,131,161.

2. USEFUL MODIFIERS

The basic abrasion resistant coating of this invention is formed from an epoxy-terminated silane, such as the ones illustrated above and a highly fluorinated aliphatic sulfonic or sulfonylic catalyst. This basic composition, however, can be modified with a host of other copolymers, additives, and moisture sensitive compounds which can form a tight matrix with the epoxy-silanes to give abrasion resistant coating. Some of the modifiers include:

a. Moisture Sensitive Compounds Capable of Forming a Tight Matrix with Epoxy Silanes These include compounds with the general formula of $R_mM(OR')_n$ in which M is Si, Al, Zr, or Ti, R is a hydrocarbon group of less than 10 carbon atoms or a group composed of hydrogen, carbon and oxygen of less than 20 carbon atoms. R' is an alkyl or acyl group of less than 10 carbon atoms, $m$ has values of 0, 1, 2 and 3 and $n$ correspondingly is 4, 3, 2, or 1. These compounds may be used in a precondensate form or in some instances in the monomeric form. These compounds form a tight matrix with epoxy silanes to give abrasion resistant coatings. The following compounds are illustrative of the type of moisture sensitive materials that can be used in the process of this invention: $Si(OET)_4$, $CH_3Si(OET)_3$, $(CH_3)_2Si(OET)_2$, $(CH_3)_3SI(OET)$, $(CH_3SCH_2CH_2)_3$-$SiOC_2H_5$, $C_6H_5Si(OET)_3$, $CH_2=CHSi(OAC)_3$, $(C_6H_5CH_2SCH_2CH_2)_2Si(oMe)_2$, $CH_3C_6H_5SCH_2(CH_3)CH\ Si(OC_2H_5)_3$, $CH_2=CHCOO(CH_2)_3\ Si(OCH_3)_3$, $CH_2=CH(C_2H_5)COOCH_2\ Si(OC_2H_5)_3$, $(C_4H_9O_4\ Ti$, $Ti(OC_3H_7)_4$, $Al(OC_4H_9)_3$, $(C_2H_5)_2\ Al(OC_2H_5)$, $(C_3H_7O)_4Zr$.

b. Other monomers

The disulfone catalysts work best on cationically polymerizable compounds, thus the other copolymerizable materials most useful in the process of this invention are those in which the comonomer is capable of cationic polymerization such as styrene, methyl styrene, vinyl amides and vinyl ethers. The best compounds, however, are the epoxy compounds such as 1,4-butanediol diglycidyl ether, diglycidyl ether of bisphenol A, and

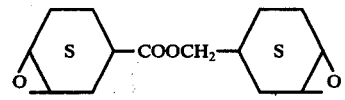

These compounds may be copolymerized with the epoxy terminated silane and a moisture sensitive compound containing Si, Al, Ti or Zr. In general all compounds that can be copolymerized with an epoxy or silane functionality are useful in the process of this invention.

C. Additives

Various additives such as dyestuffs, fine metals, metal oxides, conductive materials, leveling agents, flow control agents, U.V. absorbers, functional materials such as magnetic particles, and many other specific materials which serve a given purpose can be added to the basic resin system to obtain the desired properties. There is however, the one limitation that the additives cannot be basic materials which would neutralize the disulfone catalyst and slow down the reaction rate significantly.

3. Catalyst

The catalysts useful according to the broadest aspects of the present invention are highly fluorinated aliphatic sulfonic and sulfonylic compounds. The sulfonic materials are defined as a highly fluorinated aliphatic sulfonic acid or salt thereof. The sulfonylic materials are defined as a compound containing two highly fluorinated aliphatic sulfonyl groups attached directly to an imide or methylene (e.g., —NR'— or —CR'R"). The sulfonic materials may be partially represented by the formula

wherein
R is hydrogen, ammonium cation or metal cation and $n$ is the valence of R.

The sulfonylic catalysts may be partially represented by the formula

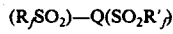

wherein

Q is a divalent radical selected from

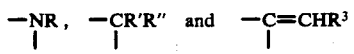

wherein R" is selected from hydrogen, chlorine, bromine, iodine, $R_fSO_2-$, alkenyl of 3-4 carbon atoms, alkyl of 1 to 20 carbon atoms (preferably 1 to 4), aryl of 1 to 20 carbon atoms (preferably to 10, and for example, phenyl, naphthyl, pyridyl, benzthienyl, etc.), and alkaryl of 7 to 20 carbon atoms (preferably to 10), R' is selected from hydrogen, chlorine, bromine, iodine, ammonium cations or metal cations, and $R^3$ is H, alkenyl (3 to 4 carbon atoms) or aryl up to 20 carbon atoms.

The catalysts wherein the N or C atom bonded to the highly fluorinated aliphatic (preferably alkyl) group has a hydrogen atom bonded thereto are active catalysts. Those having no hydrogen atom are latent and may be activated by heat, acid, chelating agent or combinations thereof as later exemplified.

Metals useful in the above definitions essentially includes all metals. All metals inclusive of and to the left of aluminum, germanium, antimony and polonium on the periodic chart of the elements, and the rare earth metals can function in the practice of this invention. The group Ia and IIa metals must be activated by acids and heat or chelating agents and heat, but they are functional. Examples of many metals, including lanthanum, are provided to show that all metals will work, even though some would be commercially useless because of expense. Preferably the metals would exclude elements 59–63, 65–71, and those above 89.

According to the Periodic Table in *Advanced Organic Chemistry*, Cotton and Wilkinson, 2d. Ed., Interscience publishers, 1966, more preferred metals would be those of Groups, Ia, IIa, VIa, VIII, Ib, IIb, IVb, and Vb and lanthanum, titanium, zirconium, chromium, molybdenum, manganese, cesium, and gadolinium based on economic considerations.

In the practice of this invention, $R_f$ and $R'_f$ are independently defined by highly fluorinated aliphatic radical which encompasses fluorinated, saturated, monovalent, aliphatic radicals, having 1 to 20 carbon atoms. The skeletal chain of the radical may be straight, branched or, if sufficiently large (e.g. at least 3 or 5 atoms) cycloaliphatic, and may be interrupted by divalent oxygen atoms or trivalent nitrogen atoms bonded only to carbon atoms. Preferably the chain of the fluorinated aliphatic radical does not contain more than one hetero atom, i.e., nitrogen or oxygen, for every two carbon atoms in the skeletal chain. A fully fluorinated group is preferred, but hydrogen or chlorine atoms may be present as substituents in the fluorinated aliphatic radical provided that not more than one atom of either is present in the radical for each carbon atom. Preferably, the fluoroaliphatic radical is a saturated perfluoroalkyl radical having a skeletal chain that is straight or branched and has a formula $C_xF_{2x+1}$ wherein $x$ has a value from 1 to 18.

The preferred active catalysts of this invention are those compounds having the formula $(R_fSO_2)_2Q(O_2SR_f')$ wherein $R_f$ and $R_f'$ are independently a highly fluorinated alkyl group, and Q is a divalent radical selected from $-NH-$ and $-CHR-$, wherein R is selected from Br, Cl, I, H, alkyl groups of 1 to 20 carbon atoms (preferably 1 to 4), alkenyl of 3 to 4 carbon atoms, aryl or aralkyl of up to 20 carbon atoms (preferably up to 10), or R'X, wherein R' is an alkylene group of up to 20 carbon atoms (preferably 1 to 4) and X is H, Br, Cl, I, $-O_2SR_f$, $-CH(O_2SR_f)_2$,

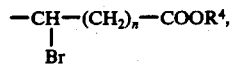

or $-CY(COOR^2)_2$ wherein $R^4$ is H or 1 to 8 alkyl and $n$ is 0 to 8, and wherein $R^2$ is alkyl of 1 to 4 carbon atoms or phenylalkyl, the alkyl group of which has 1 to 4 carbon atoms, and Y is H, Br, Cl, I, or $NO_2$.

Ammonium cation as used in the present invention is defined as cations of ammonia, primary, secondary, tertiary and quaternary amines. Alkyl, aryl, alkaryl, etc., as used in the present invention (excluding $R_f$ type groups as elsewhere defined) includes such simple substituted groups as are recognized in the art as functional equivalents of the groups (e.g., $-CH_2CH_2CH_2Cl$;

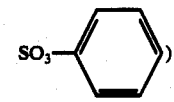

insofar as its function in the present invention is concerned.

Illustrative bis(perfluoroalkyl sulfonyl) protonic acids are;

Bis(trifluoromethylsulfonyl)methane
Tris(trifluoromethylsulfonyl)methane
Bis(trifluoromethylsulfonyl)imide
Bis(trifluoromethylsulfonyl)chloromethane
Bis(trifluoromethylsulfonyl)phenylmethane
Bis(perfluorobutylsulfonyl)methane
Bis(perfluorobutylsulfonyl)imide
Perfluorobutyltrifluoromethylmethane
Perfluorobutyltrifluoromethylimide
Trifluoromethylsulfonic acid
Perfluorobutylsulfonic acid
Perfluorooctylsulfonic acid
Ethyl 6, 6-Bis(perfluoromethyl sulfonyl)-4-bromohexanoate
Methyl 4, 4-Bis(perfluoromethyl sulfonyl)-2-carboxy-2-bromobutanoate
Ethyl 4, 4-Bis(perfluoromethyl sulfonyl)-2-carboethoxy-2-nitrobutanate
1, 1, 2, 2-Tetra(trifluoromethylsulfonyl) ethane
Bis(trifluoromethylsulfonyl)imide
Bis(trifluoromethylsulfonyl)chloromethane
Bis(trifluoromethylsulfonyl)phenylmethane
Bis(perfluororbutylsulfonyl)methane
Bis(perfluorobutylsulfonyl)imide
Perfluorobutyltrifluoromethylmethane
Perfluorobutyltrifluoromethylimide
Trifluoromethylsulfonic acid
Perfluorobutylsulfonic acid
Perfluorooctylsulfonic acid
Ethyl 6,6-Bis(perfluoromethyl sulfonyl)-4-bromohexanoate Methyl 4,4-Bis(perfluoromethyl sulfonyl)-2-carboxy-2-bromobutanoate
Ethyl 4,4-Bis(perfluoromethyl sulfonyl)-2-carboethoxy-2-nitrobutanate
1,1,2,2Tetra(trifluoromethylsulfonyl) ethane.

Selection of a most preferred perfluoroalkylsulfonyl methane catalyst is dependent on the particular monomer composition in which the catalyst is to be used and the application for which the composition is to be used.

Although their use is not necessary in the compositions of the invention to effect a cure of coatings of the composition, it is often preferable to include in addition to the fluoroalkylsulfonyl protonic acid catalysts from about 0.01 to 5 percent and preferably about 0.1 to 2 percent of a second siloxane hydrolysis and condensation catalyst. As is illustrated in the examples, some of such combination of catalysts provides synergistic effects allowing for increased rate of cure over that obtainable by the fluoroalkylsulfonyl protonic acid catalyst alone. Such siloxane hydrolysis and condensation catalysts are well known and include among others organotin compounds (see U.S. Pat. No. 3,664,997) such as bis(acetoxydibutyltin) oxide, bis[dibutyl(hexyloxy)tin]oxide, phenylbutoxytinhydroxide and the like; metal salts (see U.S. Pat. Nos. 3,719,635 and 3,772,240) such as lead 2-ethylhexoate, dibutyltin dilaurate, zinc naphthenate, zirconium octoate, tetraphenyltitanate, and the like; sulfur-containing organo tin compounds (see U.S. Pat. No. 3,499,870) such as $(C_4H_9)_2Sn[SCH_2COOC_4H_9]_2$ and the like; other catalysts such as those disclosed in U.S. Pat. Nos. 3,433,758 (vanadium compounds); 3,474,069 (zirconium alkoxides and chelates); 3,474,070 (ferric alkoxides); 3,491,054 (aluminum alkoxides); 3,689,454 (titanium chelates and alkoxides) 3,714,212 (cobalt-platinum compounds); etc. Epoxy catalysts may be added, but with no significant improvement observed.

Abrasion resistance as used herein is expressed as percentage haze produced on a sample of cured coating on a 4 mil (100 micron) clear colorless polyester film by the falling sand method of test for abrasion resistance. In accordance with this procedure which is the same as that of ASTM Designation D968-51 (Reapproved 1972) with the modification that the specimen platform is rotated at about 60 rpm during the test. Percentage haze produced in the specimen is then measured using a Gardner Hazemeter (manufactured by Gardner Laboratory Inc., Bethesda, Maryland) in accordance with ASTM Designation D1003-64 (Procedure A) (Reapproved 1970). In some instances the resistance of samples to the abrasive action of steel wool is also determined.

SUBSTRATE

The abrasion resistant coatings of the present invention are best used as coatings upon a substrate. Materials which are able to provide useful functions but do not have satisfactory abrasion resistance can be improved by the addition of coatings according to the present invention. Especially those materials which heretofore have not been coated to improve their resistance with any great success because of heat sensitivity (low melting point, destruction of heat unstable materials, etc.) can be readily improved according to the present invention because of the ability of the present compositions to bond with essentially room temperature curing.

Solid substrates that can be coated are the surfaces of fibers, sheets, and shaped solid objects. Among the solid substrates particularly useful according to the present invention are ceramic materials (e.g., glass fused ceramic sheeting and fibers), metals (e.g. sheets, fibers, aluminum, iron, silver, chromium and other metals), metal oxides, thermoplastic resins, (e.g., polyesters, polyamides, polyolefins, polycarbonates, acrylic resins, polyvinyl chloride, cellulose acetate butyrate etc.), thermoset resins (e.g., epoxy resins, polysilanes, polysiloxanes, etc.) paper, wood, natural resins (e.g. rubber, gelatin) and, in general, any solid surface which needs protection from abrasion.

Where the substrate is not naturally adherent with the compositions of the present invention, primers may be used on the substrate. Many primers are known in the art, and their purpose is to provide a layer to which the coating more readily adheres than to the original surface of the substrate. For example, in the photographic art, primers are generally used on the polyethyleneterephthalate base to improve adhesion of subsequent layers thereto. Such primers, and other known primers, would be useful in the practice of the present invention.

The surface of the substrate may itself be treated to improve adherence such as by abrasion or corona discharge to enhance bonding of the abrasion resistant layer thereto.

A large number of primers can find utility in the practice of this invention and do not affect the proportion of the top abrasion resistant coating. Some of the most useful ones, however, are the acrylic based primers such as terpolymers of butylmethacrylate, methylmethacrylate, and methacryloxy propyltrimethoxy silane, dissolved in appropriate solvents. The ratio of the components of the terpolymer can be varied over a wide range to attain the optimum primary properties for a given substrate. This primer when used in appropriate solvents such as isopropylacetate, isopropanol, toluene-methanol mixtures or other mixed solvents find utility in priming a variety of substrates; such as polycarbonates, polymethylmethacrylates, cellulose acetate butyrate, polystyrene, aluminum, polyvinylchloride, silver halide - gelatin emulsions and a host of other organic and inorganic substrates. As far as the polyester is concerned, titaniasilica, or polyvinylidene chloride are the best primers. A host of other commercial primers such as various aliphatic or aromatic urethanes, caprolactones, epoxies, and siloxanes can also find utility as primers for the coatings of the invention.

In the following examples which further illustrate the invention, the silane precondensates can be included within the definition, being silanes having polymerizable epoxy substituents on the molecule.

EXAMPLE 1

The precondensate of tetraethoxysilane was prepared by adding 86.4 g alcohol containing 86.4 g water and one drop of 0.1N HCl to 333 g tetraethoxysilane in 333 g ethanol. The resulting solution was heated for 1 hour at 78° C to reflux in a distilling flask and then during about 3 hours at a still pot temperature of 80° C. The still pot residue was diluted with an equal weight of acetone. Precondensates of other moisture sensitive modifiers were made in accordance with this procedure by substituting the tetraethoxysilane with an equivalent amount of the other modifier. This is material A.

EXAMPLE 2

The precondensate of 3(2,3-epoxy)propoxydiethoxysilane was prepared by mixing in a flask set for distillation, 16.5 g 3(2,3-epoxy)propoxytrimethoxysilane in 16.5 g ethanol, 8.0 g water in 8 g ethanol, and 1 drop of 0.1N HCl. The flask was heated to distill off volatiles to a pot temperature of 80° C., the residue cooled and diluted at 50% precondensate with acetone or other organic solvents. Precondensates of other epoxy terminated silanes were made in a similar manner by substituting the 3(2,3-epoxy)propoxytrimethoxysilane by an equivalent amount of the appropriate epoxy terminated silane.

| (i) EXAMPLE | EPOXY-SILANE(S) | CATALYSTS | CO-REACTANT(S) | PROCESSING | % HAZE |
|---|---|---|---|---|---|
| 3 | 100 g B | 2% (a) | 300 g A | 5 min. 20° C. 3 days 20–25° C. (ambient) | Tack Free 3 |
| 4 | 10 g C | 0.5 g (b) | | 15 min. 90° C. 3 days ambient | 8.7 8.8 |
| 5 | 10 g C | 0.1 g (b) | | 15 min. 90° C. 3 days ambient | 6.8 7.1 |
| 6 | 10 g precon. C | 0.1 g (c) | | 30 min. 50° C. | 5.9 |
| 7 | 10 g C | 0.2 g (d) | 10 g A | 10 min. 90° C. | 3.9 |
| 8 | 10 g precon. C | 0.2 g (d) + 0.04 g (h) | 10 g A | 10 min. 90° C | 2.6 |
| 9 | 10 g precon. C | 0.2 g (e) | 10 g A | 3 days ambient | 5.2 4.0 |
| 10 | 10 g precon. C | 0.2 g (f) | 10 g A | 3 days ambient | 9.8 |
| 11 | 10 g precon. C | 0.2 g (d) + 0.04 g (h) | 40 g A | 3 days ambient | 3.0 |
| 12 | 10 g Precon. C | 0.2 g (a) + 0.04 g (h) | 10 g A 20 g A 30 g A 40 g A | 3 days ambient | 2.5 – 7.0% |
| 13 | 10 g precon. C | 0.1 g (g) + 0.02 g (h) | 10 g A | 3 days ambient | 4.0 |
| 14 | 10 g precon. C | 0.15 g (b) + 0.06 g (h) | 5 g precon. D | 30 min. 90° C. | 2.0 |
| 15 | 10 g precon. C | 0.12 g (b) 0.06 g (h) | 2 g precon. E | 30 min. 90° C. | 8.8 |
| 16 | 10 g precon. C | 0.11 g (b) 0.06 g (h) | 1 g F | 30 min. 90° C. | 8.8 |
| 17 | 10 g precon. C | 0.12 (b) | 2 g precon. G | 30 min. 90° C. | 8.9 |
| 18 | 10 g C | 0.11 (b) 0.04 (h) | 1 g precon. E | 30 min. 90° C. | 7.0 |
| 19 | 10 g C | 0.12 g (b) 0.06 g (h) | 2 g precon. F | 3 days ambient | 9.3 |
| 20 | 10 g precon. C | 0.2 g (b) | 10 g H | 30 min. 90° C. | 4.3 |
| 21 | 10 g precon. C | 0.5 g (b) | 4 g H | 30 min. 90° C. | 6.0 |
| 22 | 10 g C | 0.4 g (b) 0.16 g (h) | 10 g H | 30 min. 90° C. | 7.8 |
| 23 | 10 g C | 0.4 g (b) 0.16 g (h) | 10 g I | 30 min. 90° C. | 12.9 |
| 24 | | | 1 g Ti(OC₃H₇)₄ | 30 min. 90° C. 24 hours. ambient | 7.7 12.8 |
| 25 | 10 g C | 0.05 g (b) | | 30 min. 90° C. | tacky |
| 26 | 10 g C | 0.05 g (i) | | | tacky |
| 27 | | 0.10 g (i) | | | rubbery |
| 28 | | 0.50 g (i) 1.00 g (i) | | | rubbery |
| 29 | 10 g C | 0.05 g (i) | | 3 days ambient | tacky |
| 30 | | 0.10 g (i) | | | tacky |
| 31 | | 0.50 g (i) | | | rubbery |
| 32 | | 1.00 g (i) | | | rubbery |
| 33 | 10 g precon. C | 0.50 g (i) | | 30 min. 90° C. | rubbery |
| 34 | 10 g precon. C | 0.50 g (i) | | 3 days ambient | rubbery |
| 35 | 11.4 g C (ii) | 0.10 g (j) | | 3 days ambient | 7.5 |
| 36 | | 0.10 g (k) | | | |
| 37 | | 0.10 g (l) | | | |
| 38 | | 0.10 g (m) | | | |
| 39 | | 0.10 g (n) | | | |
| 40 | | 0.10 g (o) | | | |
| 41 | | 0.10 g (p) | | | |
| 42 | 10 g J | 0.1 g (d) | 10 g A | 3 days ambient | 20.3 |
| 43 | 10 g J | 0.5 g (d) | 10 g A | | 8.6 |
| 44 | 10 g J | 1.0 g (d) | 10 g A | 3 days ambient | 4.6 |
| 45 | 10 g J | 2.0 g (d) | 10 g A | | 5.1 |
| 46 | 10 g J | 5.0 g (d) | 10 g A | | 6.4 |
| 47 | 10 g K (ii) | 0.15 g (q) | | 24 hours ambient | 8.0 |
| 48 | 10 g L (ii) | 0.20 g (b) | | 24 hours ambient | 7.4 |

| (i) EXAMPLE | EPOXY-SILANE(S) | CATALYST(S) | CO-REACTANT(S) | PROCESSING | Initial % HAZE |
|---|---|---|---|---|---|
| 49 | 10 g M | 0.50 g (q) | | 8 hours ambient | hard, tack free film formed in all cases |
| 50 | | 0.50 g (k) | | | |
| 51 | | 0.50 g (f) | | | |
| 52 | | 0.50 g (d) | | | |
| 53 | | 0.50 g (g) | | | |
| 54 | | 0.50 g (b) | | | |
| 55 | | 0.50 g (e) | | | |

| | | | | | | |
|---|---|---|---|---|---|---|
| 56 | | 0.50 g (a) | | | | |
| 57 | | 0.50 g (j) | | | | |
| 58 | | 0.50 g (l) | | | | |
| 59 | | 0.50 g (n) | | | | |
| 60 | 10 g M | 0.50 g (m) | | | | |
| 61 | 10 g B (ii) 40% wt. sol | 1% (r) | | 30 min. 90° C. | 0.3 | 2.2 |
| 62 | | 1% (s) | | | 0.2 | 2.7 |
| 63 | | 1% (t) | | | 0.2 | 5.0 |
| 64 | 100 g B (ii) | 5% (u) | | 60 min. 90° C. | | 6.7 |
| 65 | 40% wt. sol | 5% (v) | | and | | 6.9 |
| 66 | | 5% (w) | | 30 min. 120° C. | | 10.3 |
| 67 | | 5% (x) | | | | 9.2 |
| 68 | | 5% (y) | | | | 12.6 |
| 69 | | 5% (z) | | | | 22.7 |
| 70 | | 5% (aa) | | | | 10.0 (iii) |
| 71 | | 5% (bb) | | | | 15.4 (iii) |
| 72 | | 5% (cc) | | | | 8.9 (iii) |
| 73 | | 5% (dd) | | | tacky | |
| 74 | | 5% (ee) | | | tacky | |
| 75 | | 3% (dd) and 3% (ff) | | | | 3.9 |

| (i) EXAMPLE | EPOXY-SILANE(S) | CATALYST(S) | CO-REACTANT(S) | PROCESSING | % HAZE |
|---|---|---|---|---|---|
| 76 | 10 g B (ii) 40% wt. sol | 3% (ee) and 3% (ff) | | 60 min. 90° C. and 30 min. 120° C. | 10.9 |
| 77 | 10 g B (iii) 40% | 3% (gg) and 3% (ee) | | 30 min. 120° C. | 4.6 |
| 78 | 10 g B 60% hydrolized | 0.2 g (hh) | | 16 hours ambient | 7.6 |
| 79 | 10 g C | 0.1 g (d) | 100 g precond. M | 72 hours ambient | 6.3 |

(i) all compositions coated 0.2 mils wet on primed polyester.
(ii) in ethyl acetate.
(iii) Abrasion resistance to steel wool 500 cycles, 5 lbs.

Certain materials are repeatedly used in the following examples. For the convenience of presenting the examples in table form, these materials will be represented by the following symbols:

| | | | |
|---|---|---|---|
| A | precondensate of M | (a) | $C_4F_9SO_2NHCF_3SO_2$ |
| B | precondensate of C | (b) | $(CF_3SO_2)_2CHCH_2C(Br)(COOC_2H_5)_2$ |
| C | $CH_2-CH(O)-CH_2-O-(CH_2)_3Si(OMe)_3$ (epoxide) | (c) | $(CF_3SO_2)_2CH-CH_2CH(COOC_2H_5)_2$ |
| D | $CH_3Si(OEt)_3$ | (d) | $(CF_3SO_2)_2CHBr$ |
| E | $C_6H_5-Si(OEt)_3$ | (e) | $(CF_3SO_2)_2CHCH_2C(NO_2)(COOEt)_2$ |
| F | $CH_2=CH-Si(OEt)_3$ | (f) | $(CF_3SO_2)_2CHCl$ |
| G | $CH_3Si(OEt)_3$ | (g) | $(CF_3SO_2)_2CHCH_2CH(CF_3SO_2)_2$ |
| H | 1,4-butanediol | (h) | dibutyltin dilaurate |
| I | (S-containing bis-epoxide with $-COOCH_2-$ bridge) | (i) | $BF_3$ etherate |
| J | prehydrolyzate of C in solvent (acetone, ethanol, and ethyl acetate used interchangeably) | (j) | $(CF_3SO_2)_2CHCH_2CH(Br)CH_2CH_2Cl$ |
| K | (cyclohexene oxide)$-CH_2-CH_2-Si(OMe)_3$ | (k) | $(CF_3SO_2)_2CHC_6H_5$ |
| L | $CH_2-CH(O)-Si(OEt)_3$ | (l) | $(C_4F_9SO_2)_2CHC_6H_5$ |
| M | $Si(OEt)_4$ | (m) | $(C_4F_9SO_2)_2CHBr$ |
| | | (n) | $(C_4F_9SO_2)_2CH_2$ |
| | | (o) | $(CF_3SO_2)_2CHSO_2CF_3$ |
| | | (p) | $(C_4F_9SO_2)_2CHCl$ |
| | | (q) | $(CF_3SO_2)_2CH_2$ |
| | | (r) | $(CF_3SO_2)_2CHCH_2CH(Br)CH_2Cl$ |
| | | (s) | (furyl)$-CH=C(SO_2CF_3)_2$ |
| | | (t) | $[(CF_3SO_2)_2CH]_2CH_2$ |

-continued

| | |
|---|---|
| (u) | La[((CF$_3$SO$_2$)$_2$CH]$_3$ |
| (v) | Ni[(CF$_3$SO$_2$)$_2$CH]$_2$ |
| (w) | Zn[(CF$_3$SO$_2$)$_2$CH]$_2$ |
| (x) | Pb[(CF$_3$SO$_2$)$_2$CH]$_2$ |
| (y) | Mn[(CF$_3$SO$_2$)$_2$CH]$_2$ |
| (z) | Ag(CF$_3$SO$_2$)$_2$CBr |
| (aa) | C$_4$F$_9$SO$_2$—N—SO$_2$CF$_3$ with N-morpholino group |
| (bb) | NH$_4$(CF$_3$SO$_2$)$_2$CBr |
| (cc) | Pb(SO$_2$CF$_3$)$_2$ |
| (dd) | Ba[(CF$_3$SO$_2$)$_2$CH]$_2$ |
| (ee) | K(CF$_3$SO$_2$)$_2$CH |
| (ff) | oxalic acid |
| (gg) | P$_2$O$_5$ |
| (hh) | CF$_3$SO$_3$H |

The tabulation of examples is generally thought to speak for itself, but some examples do require explanation.

All examples, unless otherwise indicated use ethanol or ethanol/water solvent systems. All percentage haze values are based upon the falling sand test (ASTM Designation D968-51) unless otherwise indicated. Examples 25-34 are comparitive examples of prior art processes of cure. Examples 49-60 show that the catalysts of the present invention cure silane groups as well as epoxy groups, this in itself being novel and unobvious.

Examples 73 and 74 show the latency of certain catalysts, while examples 75 and 76 show how that latent effect can be activated (by acid and heat). Example 77 similarly shows that latent catalysts can be activated by a chelating compound and heat.

It is believed that the catalysts of this invention produce significantly improved abrasion resistant coatings from monomers known in the art by not only catalyzing both functional terminal groups, but also by causing the silane groups to react with sufficient speed that the rapid cure of the epoxy groups does not restrict the freedom of movement of the growing molecules to such a degree that the silane groups will not cure. By taking rapid measurements of free epoxide content and free siloxane content, it is seen that by the time 80% of the epoxy groups are reacted, at least 10% of the siloxane groups are reacted. It is thought that this relative rate of reaction of these groups is important to the novel properties in the product.

The use of the catalysts of the present invention readily effect this type of cure at temperatures about 10° C. as well as at conventional elevated temperatures by placing the reactive epoxy-terminated siloxane monomers in caralytic proximity to a catalytically active amount of the catalysts of this invention.

The coatings of this invention are generally useful wherever the addition of an abrasion resistant coating would be desirable. Such obvious areas of utility include coatings on glass or plastic optic lenses, on reflective sheeting such as street signs, intensifying screens as known in the radiographic and related arts, protection of photoconductive and electrophotoconductive surfaces, on thermographic and photothermographic elements, desk and countertop surfaces (especially cutting surfaces), acrylic ceramic coatings (as on car bodies), boat hulls and any other surface subject to abrasion.

Surprisingly, the flexibility of the compositions of the present invention is extremely high for such a hard abrasion resistant material. Some compositions in film form can be subjected to a bend around a one inch diameter tube without cracking or stress marks. This is a degree of flexibility far greater than that of prior art abrasion resistant materials of any commercial value.

The term epoxy-terminated silane has been used generally throughout the specification, but as clearly shown by one of the structural formulae used in describing certain epoxy-substituted silanes, the epoxy group does not have to be terminal (i.e., a 1,2 epoxy group). Any epoxy group in a position on the chain which is capable of polymerizing as epoxy groups are known to polymerize is included on the term epoxy-terminated siloxane. For example, the epoxy groups on the saturated rings are not truly terminal but are prepared by any of the processes for hydrolyzing silanes that are known in the art. Generally, about 1 to 6 moles of water per mole of siloxane acid and an acid catalyst are used. Suitable acid catalysts are listed in U.S. Pat. No. 3,776,881 and procedure for the preparation of the precondensates is described in U.S. Pat. No. 2,404,426, of the precondensates of the epoxy-terminated silanes (and the method used for the precondensates in the examples) are preferably prepared by adding 5 to 6 moles of water in an equal weight of ethanol containing about 0.5 milliequivalent of hydrogen chloride to one mole of the epoxy-terminated silane in an equal amount of ethanol. The mixture is then heated in a distilling apparatus to a bottoms temperature of about 80° C. to remove ethanol leaving the precondensate as still bottoms.

The precondensates of the moisture sensitive modifier (compounds of the formula $R_mM(OR')_n$ are preferably prepared in a method similar to that for the epoxy-terminated silanes using, however, 2 to 3 moles of water, with or without the addition of ethanol. The precondensates are ready for use as prepared but may be stabilized against further condensation by the addition of an appropriate solvent such as acetone.

It is known in the art that with the use of any acid catalyst, basic sites and basic ingredients complicate the effectiveness of the system. For example, basic nitrogens may exist in the aliphatic chain of the epoxy-terminated silanes in the present invention. However, these basic nitrogens tend to form electronic bonds with the acid catalyst and inhibit their activity. In compositions where such basic sites or basic moieties are present, the amount of catalyst necessary to effect a catalytically active concentration is increased. It might also be desirable to lower the pH of the system to block the basic sites. Such groups as divalent sulfur (C=S) and aromatic rings have similar inhibiting effects upon the catalyst. They do not completely prevent polymerization, but do inhibit it.

Among other preferred substrates to be coated in the present invention are painted surfaces (including acrylic ceram auto paints), marble surfaces, polyesters (e.g., polyethylene terephthalate), finished photographic products (by definition, prints, films, transparencies, negatives, microfiche, motion picture film, microfilm, printing plates and the like), and works of art.

A particularly useful coating includes filled resin compositions. The resin itself must still contain at least 15 percent by weight of units derived from an epoxy-terminated silane, but will still be useful with up to 50 weight percent of the total system (reducing the epoxy-silane of the total coating system to 7.5 percent although still 15 percent of the resin) as filler. Particularly good fillers include titania and silica.

A further surprising fact in the practice of this invention is that when two catalysts were combined with an epoxy-terminated silane, one a catalyst for epoxy polymerization (BF$_3$, monoethylamine) and one for silane polymerization (dibutyltin dilaurate), and the composition was heated in an oven for a prolonged time, the composition did not cure to a hardness comparable to identical compositions cured with highly fluorinated aliphatic sulfonylic and sulfonic catalysts. In view of the fact that the catalysts used in the practice of this invention were not known as catalysts for siloxanes, this result is noteworthy.

What is claimed is:

1. A coated article comprising a substrate and an abrasion resistant coating on the substrate wherein said coating is from 0.1 to 500 microns thick and comprises a polymer comprising at least 15 percent by weight of units from an epoxy-terminated silane represented by the formulae:

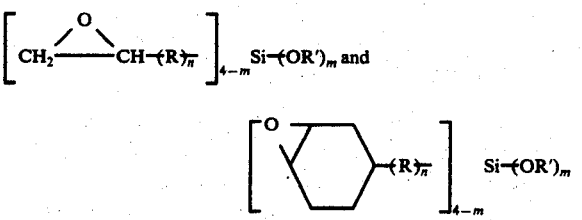

wherein
each R is independently a non-hydrolyzable divalent hydrocarbon radical of less than 20 carbon atoms, or a divalent radical of less than 20 carbon atoms the backbone of which is C atoms which may be interrupted by individual atoms from the group of N and O, the O atoms in the form of ether linkages,
m is 1, 2, or 3,
n is 0, or 1, and
R' is an aliphatic hydrocarbon radical of less than 10 carbon atoms, an acyl radical of less than 10 carbon atoms, or a radical of the formula (CH$_2$CH$_2$O)$_k$Z in which k is an integer of at least 1, and Z is hydrogen or an aliphatic hydrocarbon radical of less than 10 carbon atoms,
cured in the presence of a catalytically active amount of a highly fluorinated sulfonylic catalyst comprising two highly fluorinated aliphatic sulfonyl groups attached directly to an imide or a methylene or highly fluorinated sulfonic catalyst comprising a highly fluorinated aliphatic sulfonic acid or salt thereof.

2. The coated article of claim 1 wherein said polymer further comprises up to 85 percent by weight units derived from materials copolymerizable with epoxy or silane groups.

3. The coated article of claim 2 wherein said highly fluorinated sulfonyl catalyst is represented by the formula:

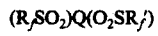

wherein
R$_f$ and R$_f'$ are independently a highly fluorinated alkyl group, and
Q is a divalent radical selected from —NH— and —CHR—
wherein R is selected from Br, Cl, I, H, alkyl groups of 1 to 20 carbon atoms, alkenyl of 3 to 4 carbon atoms, aryl or aralkyl of up to 20 carbon atoms, or R'X,
wherein R' is an alkylene group of up to 20 carbon atoms and X is Br, Cl, I, —O$_2$SR$_f$, -CH(O$_2$SR$_f$)$_2$,

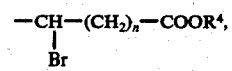

or —CY(COOR$^2$)$_2$
wherein R$^4$ is H or 1 to 8 alkyl and n is 0 to 8, and
wherein R$^2$ is alkyl of 1 to 4 carbon atoms or phenylalkyl, the alkyl group of which has 1 to 4 carbon atoms, and Y is H, Br, Cl, I, or NO$_2$.

4. The coated article of claim 3 wherein R$_f$ and R$_f'$ represent perfluorinated alkyl groups.

5. The coated article of claim 1 wherein the surface of the substrate is coated with a primer to enhance bonding between the coating and the substrate.

6. The coated article of claim 1 wherein said sulfonic and sulfonylic catalyst are seleted from the formulae:

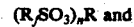

wherein
R is selected from hydrogen ammonium cation and metal cation and n is the valence of R,
R$_f$ and R$_f'$ are independently highly fluorinated aliphatic groups, and
Q is selected from

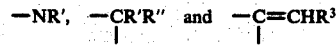

wherein
R' is selected from hydrogen, chlorine, bromine, iodine, ammonium cation, or metal cation
R'' is selected from hydrogen, chlorine, bromine, iodine, R$_f$SO$_2$, alkenyl of 3 to 4 carbon atoms, alkyl of 1 to 20 carbon atoms, aryl of up to 20 carbon atoms, and alkaryl of up to 20 carbon atoms and
R$^3$ is H, alkenyl of 3 to 4 carbon and aryl of up to 20 carbons.

7. The coated article of claim 6 wherein R$_f$ and R$_f'$ represent perfluorinated alkyl groups.

8. The coated article of claim 6 wherein said substrate is a painted surface.

9. The coated article of claim 6 wherein said substrate is metal.

10. The coated article of claim 6 wherein $R_f$ and $R_f'$ represent perfluorinated alkyl groups.

11. The coated article of claim 6 wherein said coating comprises at least some filler up to 50 weight-percent of the coating.

12. The coated article of claim 1 wherein said coating comprises at least some filler up to 50 weight-percent of the coating.

13. The coated article of claim 12 wherein said filler comprises titania and silica.

14. The coated articles of claim 1 wherein said coating comprises pigments or dyes.

15. The coated articles of claim 1 wherein said coating comprises heat stabilizers.

16. The coated article of claim 1 wherein the substrate comprises a polyester.

17. The coated article of claim 1 wherein the substrate comprises an acrylic resin.

18. The coated article of claim 1 wherein the substrate is glass.

19. The coated article of claim 1 wherein the substrate comprises a polycarbonate.

20. The coated article of claim 1, wherein the substrate comprises a cellulose acetate butyrate.

21. The coated article of claim 1, wherein said substrate comprises a finished photographic product.

22. A film from 0.1 to 500 microns thick comprising a polymer having at least 15 percent by weight of units derived from an epoxy-terminated silane represented by the formulae:

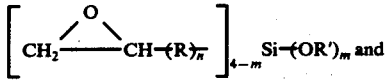

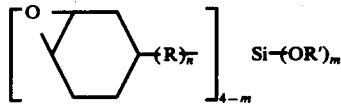

wherein,
each R is independently a non-hydrolyzable divaent hydrocarbon radical of less than 20 carbon atoms, or a divalent radical of less than 20 carbon atoms the backbone of which is C atoms which may be interrupted by individual atoms from the group of N the O, the O atoms in the form of ether linkages,
m is 1, 2, or 3,
n is 0, or 1, and
R' is an aliphatic hydrocarbon radical of less than 10 carbon atoms, an acryl radical of less than 10 carbon atoms, or a radical of the formula $(CH_2CH_2O)_kZ$ in which k is an integer of at least 1, and Z is hydrogen or an aliphatic hydrocarbon radical of less than 10 carbon atoms,
cured in the presence of a catalytically active amount of a highly fluorinated sulfonylic catalyst comprising two highly fluorinated aliphatic sulfonyl groups attached directly to an imide or a methylene or highly fluorinated sulfonic catalyst comprising a highly fluorinated aliphatic sulfonic acid or salt thereof.

23. The film of claim 22 wherein said polymer further comprises up to 85 percent by weight of units derived from materials copolymerizable with silane or epoxy groups.

24. The film of claim 23 wherein said catalyst is represented by the formula:

$(R_fSO_2)Q(O_2SR_f')$ wherein
$R_f$ and $R_f'$ are independently a highly fluorinate alkyl group, and
Q is a divalent radical selected from -NH- and -CHR- wherein R is selected from Br, Cl, I, H, alkyl groups of 1 to 20 carbon atoms, alkenyl of 3 to 4 carbon atoms, aryl or aralkyl of up to 20 carbon atoms, or R'X,
wherein R' is an alkylene group of up to 20 carbon atoms and X is H, Br, Cl, I, $-O_2SR_f$, $-CH(O_2SR_f)_2$,

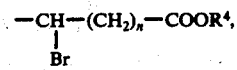

or $-CY(COOR^2)_2$
wherein $R^4$ is H or 1 to 8 alkyl and n is 0 to 8, and
wherein $R^2$ is alkyl of 1 to 4 carbon atoms or phenylalkyl, the alkyl group of which has 1 to 4 carbon atoms, and Y is H, Br, Cl, I, or $NO_2$.

25. The film of claim 22 wherein said sulfonic and sulfonylinc catalyst is represented by the formmulae:

$(R_fSO_3)_nR$ and $(R_fSO_2)-Q-(SO_2R_f')$ wherein
R is selected from hydrogen ammonium cation and metal cation and n is the valence of R,
$R_f$ and $R_f'$ are independently highly fluorinated aliphatic groups, and
Q is selected from

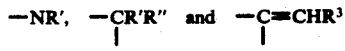

wherein
R' is selected from hydrogen, chlorine, bromine, iodine, ammonium cation, or metal cation
R" is selected from hydrogen, chlorine, bromine, iodine, $R_fSO_2$, alkenyl of 3 to 4 carbon atoms, alkyl of 1 to 20 carbon atoms, aryl of up to 20 carbon atoms, and alkaryl of up to 20 carbon atoms and
$R^3$ is H, alkenyl of 3 to 4 carbons and aryl of up to 20 carbons.

26. The film of claim 22 wherein said catalyst is represented by the formulae:

$(R_fSO_2)Q(O_2SR_f')$ wherein
$R_f$ and $R_f'$ are independently a highly fluorinated aliphatic group, and
Q is a divalent radical selected from -NH- and -CHR- wherein R is selected from Br, Cl, I, H, alkyl groups of 1 to 20 carbon atoms, alkenyl of 3 to 4 carbon atoms, aryl or aralkyl of up to 20 carbon atoms, or R'X,
wherein R' is an alkylene group of up to 20 carbon atoms and X is Br, Cl, I, $-O_2SR_f$, $-CH(O_2SR_f)_2$,

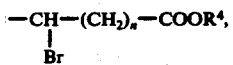

or -CY(COOR$^2$)$_2$ wherein R$^4$ is H or 1 to 8 alkyl and $n$ is 0 to 8, and
wherein R$^2$ is alkyl of 1 to 4 carbon atoms or phenylalkyl, the alkyl group of which has 1 to 4 carbon atoms, and Y is H, Br, Cl, I, or NO$_2$.

27. A method of forming an abrasion resistant cooling on a substrate of from 0.1 to 500 microns thickness which comprises curing a composition comprising at least 15 percent by weight units derived from an epoxy-terminated silane represented by the formulae:

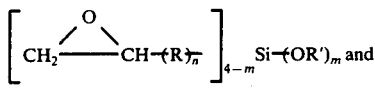

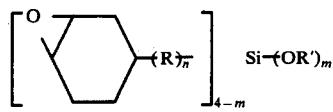

wherein,
each R is independently a non-hydrolyzable divalent hydrocarbon radical of less than 20 carbon atoms, or a divalent radical of less than 20 carbon atoms the backbone of which is C atoms which may be interrupted by individual atoms from the group of N and O, the O atoms in the form of ether linkages,
$m$ is 1, 2, or 3,
$n$ is 0, or 1, and
R' is an aliphatic hydrocarbon radical of less than 10 carbon atoms, an acyl radical of less than 10 carbon atoms, or a radical of the formula (CH$_2$CH$_2$O)$_k$Z in which k is an integer of at least 1, and Z is hydrogen or an aliphatic hydrocarbon radical of less than 10 carbon atoms,
in catalytic proximity to a catalytically active amount of a highly fluorinated sulfonic catalyst comprising a highly fluorinated aliphatic sulfonic acid or salt thereof or highly fluorinated sulfonylic catalyst comprising two highly fluorinated aliphatic sulfonyl groups attached directly to an imide or a methylene and thereby bonding said composition to said substrate.

28. The method of claim 27 wherein said bonding is effected by in situ cure of said composition upon said substrate.

29. The method of claim 27 wherein a primer is applied to said substrate prior to said in situ cure.

30. The method of claim 27 wherein said catalyst is represented by the formulae:

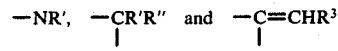

wherein
R is selected from hydrogen ammonium cation and metal cation and $n$ is the valence of R,
R$_f$ and R$_f'$ are independently highly fluorinated aliphatic groups, and
Q is selected from

wherein
R' is selected from hydrogen, chlorine, bromine, iodine, ammonium cation, or metal cation
R" is selected from hydrogen, chlorine, bromine, iodine, R$_f$SO$_2$, alkenyl of 3 to 4 carbon atoms, alkyl of 1 to 20 carbon atoms, aryl of up to 20 carbon atoms, and alkaryl of up to 20 carbon atoms and
R$^3$ is H, alkenyl of 3 to 4 carbons and aryl of up to 20 carbons.

31. The method of claim 27 wherein the highly fluorinated aliphatic sulfonylic catalyst is represented by the formula:

(R$_f$SO$_2$)Q(O$_2$SR$_f'$)

wherein
R$_f$ and R$_f'$ are independently a highly fluroinated aliphatic group, and
Q is a divalent radical selected from -NH- and -CHR-
wherein R is selected from Br, Cl, I, H, alkyl groups of 1 to 20 carbon atoms, alkenyl of 3 to 4 carbon atoms, aryl or aralkyl of up to 20 carbon atoms, or R'X,
wherein R' is an alkylene group of up to 20 carbon atoms and X is H, Br, Cl, I, -O$_2$SR$_f$, -CH(O$_2$SR$_f$)$_2$,

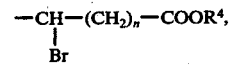

or -CY(COOR$^2$)$_2$
wherein R$^4$ is H or 1 to 8 alkyl and $n$ is 0 to 8, and
wherein R$^2$ is alkyl of 1 to 4 carbon atoms or phenylalkyl, the alkyl group of which has 1 to 4 carbon atoms, and Y is H, Br, Cl, I, or NO$_2$.

* * * * *

UNITED STATES PATENT AND TRADEMARK OFFICE
CERTIFICATE OF CORRECTION

PATENT NO. : 4,049,861
DATED : September 20, 1977
INVENTOR(S) : Mohammad S. Nozari It is certified that error appears in the above-identified patent and that said Letters Patent are hereby corrected as shown below:

Claim 6, line 4, "$(R_fSO_2)-A-(SO_2R'_f)$" should be --$(R_fSO_2)-Q-(SO_2R'_f)$--;

Claim 6, line 20, "3 to 4 carbon" should be --3 to 4 carbons--;

Claim 22, line 13, "N the O" should be --N and O--;

Claim 22, line 17, "acryl" should be --acyl--; and

Claim 27, line 1, "cooling" should be --coating--.

*Signed and Sealed this*

*Thirty-first* Day of *January 1978*

[SEAL]

Attest:

RUTH C. MASON
*Attesting Officer*

LUTRELLE F. PARKER
*Acting Commissioner of Patents and Trademarks*